N. A. BAKER.

Improvement in Mechanical Power.

No. 124,415.                    Patented March 12, 1872.

Attest

Inventor
N A Baker

UNITED STATES PATENT OFFICE.

NOAH A. BAKER, OF COVINGTON, KENTUCKY, ASSIGNOR TO HIMSELF AND J. O'HARA, JR., OF SAME PLACE.

IMPROVEMENT IN MECHANICAL POWERS.

Specification forming part of Letters Patent No. 124,415, dated March 12, 1872.

Specification of the invention of NOAH A. BAKER, of the city of Covington, Kenton county, Kentucky, of an Improvement in "Mechanical Power."

Figure 1:
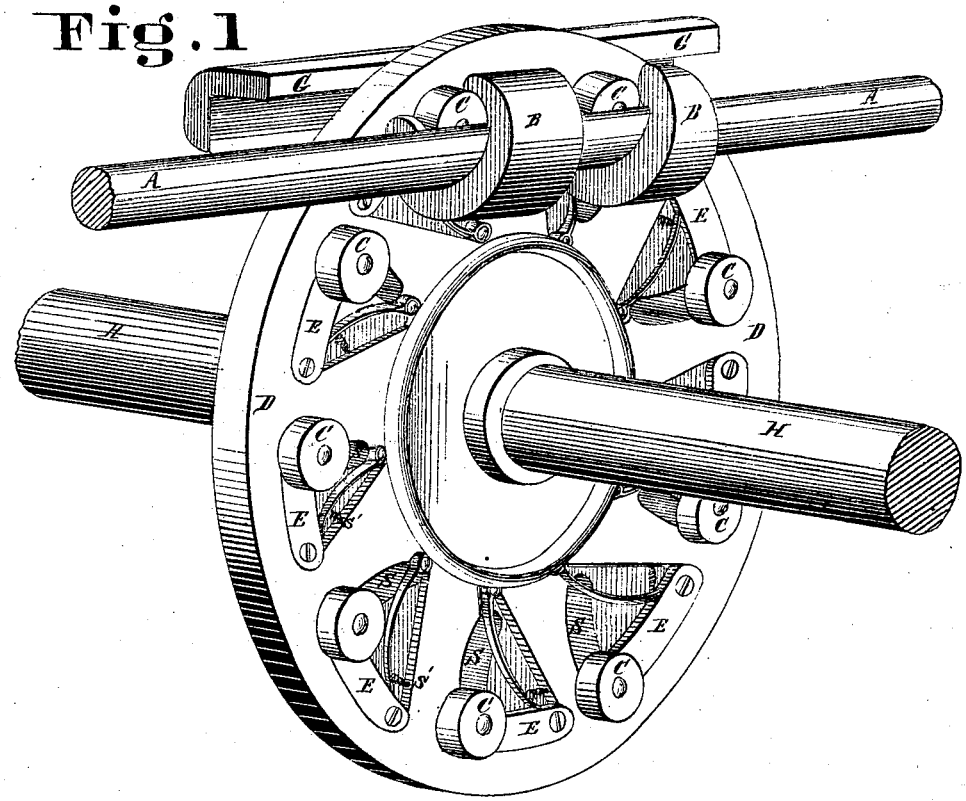

Figure 1 represents the machine in perspective, the several parts being indicated by the following letters and figures of reference.

A A, main shaft; B B, screw on main shaft A A; D D, driving-wheel; C, rollers, geared on driving-wheel D D; E, arm, supporting roller C; S, slot in driving-wheel D D, through which axle of rollers C rises and falls; S', spiral spring, supporting roller arm E'; G, upper guide, controlling rollers C; H H, axle of driving-wheel.

Figure 2:
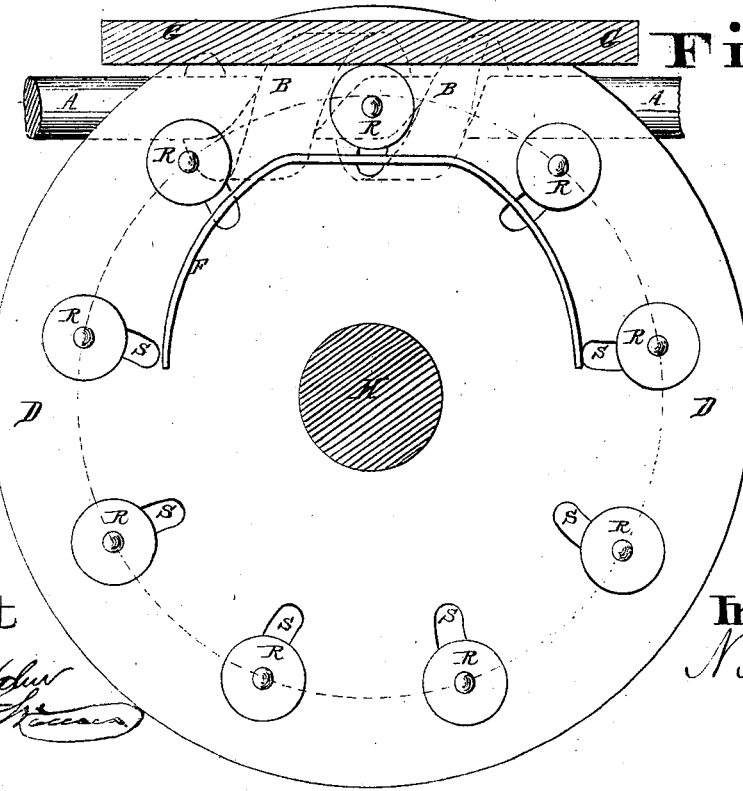

Fig. 2 represents the reverse side of Fig. 1.

A A, main shaft; B B, screw on main shaft A A, (invisible on this side of the machine;) D D, driving-wheel; R, rollers on driving-wheel D D, geared on same axle with rollers C in Fig. 1; S, slot in driving-wheel D D, through which axle of rollers R and C rises and falls; G, upper guide, controlling rollers R and C; F, under guide or guard, supporting rollers R in case of failure of spiral spring S'; H, axle of driving-wheel.

The above mechanical power may be applied to and is designed to apply power generated by whatever means to the movement of machinery of any kind or description. Its several parts may be constructed of any power and dimensions desirable or needed for the object to be attained, either in wood or metal.

Its Operation.

The rollers represented by C in Fig. 1, and R in Fig. 2 of the accompanying drawing, are geared upon the same axle which passes through the slot S' in the driving-wheel D D, and are supported by the arm E', made fast to their axle equidistant from the rollers R and C, and inclosed within the body of the wheel. The driving-wheel, with its gearing of rollers, being set in motion by any motive power geared to its axle, in revolving brings the rollers C successively in contact with the screw B B on shaft A A, Fig. 1, and roller R, as represented in Fig. 2, at the same time being brought in contact with the upper guide G', is depressed, and carries down with it roller C, (being on the same axle,) which is permitted by the slot S, until it is brought on a horizontal parallel line with the center of the shaft A A, and passes on that line through the screw, operating on it upon the principle of the wedge—the simplest of all mechanical implements—setting it in rapid motion, making a complete revolution with the passage of each successive roller through the screw.

By means of a spiral spring under the arm of the rollers they are returned to their original position at the circumference of the wheel, immediately upon being disengaged from the screw and relieved from the controlling pressure of the guide. In case the spiral springs, or any of them, should fail to perform their proper functions, the under guide or guard F, represented in Fig. 2, will serve to lift the rollers into the screw with the same effect.

This mechanical power is equally effective and operates with the same facility whether the motion be forward or backward, and may be multiplied and geared together illimitably, producing at the extreme point great rapidity of motion.

I claim as my invention, and for which I desire the patent to be issued as prayed in my foregoing petition—

The combination of the wheel D with the adjustable rollers C, and the controlling-guide G with the screw-shaft A B, operating as above described, for the movement of machinery without the aid of cogs, as described.

N. A. BAKER.

Witnesses:
FRANK P. HELM,
CHAS. G. WALLACE.